US011070555B2

(12) United States Patent
Vikberg et al.

(10) Patent No.: US 11,070,555 B2
(45) Date of Patent: Jul. 20, 2021

(54) USER PROFILE PROVISIONING IN WLAN

(71) Applicant: Telefonaktiebolaget LM Ericsson (publ), Stockholm (SE)

(72) Inventors: Jari Vikberg, Järna (SE); Icaro L. J. Da Silva, Solna (SE); Filip Mestanov, Brottby (SE); Oumer Teyeb, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 367 days.

(21) Appl. No.: 15/754,329

(22) PCT Filed: Aug. 25, 2015

(86) PCT No.: PCT/EP2015/069451
§ 371 (c)(1),
(2) Date: Feb. 22, 2018

(87) PCT Pub. No.: WO2017/032410
PCT Pub. Date: Mar. 2, 2017

(65) Prior Publication Data
US 2018/0295510 A1    Oct. 11, 2018

(51) Int. Cl.
*H04L 29/00* (2006.01)
*H04L 29/06* (2006.01)
*H04W 8/20* (2009.01)
*H04W 12/06* (2021.01)
(Continued)

(52) U.S. Cl.
CPC ........ *H04L 63/0892* (2013.01); *H04L 67/306* (2013.01); *H04W 8/02* (2013.01);
(Continued)

(58) Field of Classification Search
CPC ....... H04W 12/06; H04W 8/02; H04W 84/12; H04L 63/0892; H04L 67/306; H04L 9/3213; H04L 9/3268
See application file for complete search history.

(56) References Cited

U.S. PATENT DOCUMENTS

| 8,694,008 | B2 | 4/2014 | Bonner | |
| 9,826,443 | B2* | 11/2017 | Shaheen | H04W 36/0022 |
| 2016/0227443 | A1* | 8/2016 | Tomici | H04W 8/04 |

FOREIGN PATENT DOCUMENTS

| EP | 1 693 995 A1 | 8/2006 |
| EP | 2 744 273 A1 | 6/2014 |

(Continued)

OTHER PUBLICATIONS

International Search Report and Written Opinion of the International Searching Authority for International Application No. PCT/EP2015/069451 dated May 3, 2016, 12 pages.
(Continued)

*Primary Examiner* — Jeffrey C Pwu
*Assistant Examiner* — Helai Salehi
(74) *Attorney, Agent, or Firm* — Sage Patent Group

(57) ABSTRACT

The invention relates to a method for operating an entity of a WLAN network. The method comprises the following steps. First, an access request is received from a subscriber of a mobile communications network, wherein the access request is based on a mobile network identity used in the mobile communications network to authenticate the subscriber. Then, from an authentication entity configured to authenticate a subscriber in the mobile communications network, radio resource information is received for the subscriber which comprises subscriber specific information how radio resources of a radio network part of the mobile communications network should be used. Furthermore, a radio resource usage of the subscriber in the WLAN network is determined taking into account the received radio resource information.

14 Claims, 7 Drawing Sheets

(51) Int. Cl.
  *H04W 12/069* (2021.01)
  *H04L 29/08* (2006.01)
  *H04W 8/02* (2009.01)
  *H04W 84/12* (2009.01)

(52) U.S. Cl.
  CPC ........... *H04W 8/20* (2013.01); *H04W 12/068* (2021.01); *H04W 12/069* (2021.01); *H04L 69/329* (2013.01); *H04W 84/12* (2013.01)

(56) References Cited

FOREIGN PATENT DOCUMENTS

| WO | WO 2014/084760 A1 | | 6/2014 | | |
|----|----|----|----|----|----|
| WO | WO-2014084760 A1 | * | 6/2014 | ......... | H04L 63/0876 |
| WO | WO 2015/039096 A1 | | 3/2015 | | |
| WO | WO-2015039096 A1 | * | 3/2015 | ............. | H04W 8/04 |
| WO | WO 2015/139796 A1 | | 9/2015 | | |
| WO | WO-2016140469 A1 | * | 9/2016 | ............. | H04W 8/18 |

OTHER PUBLICATIONS

IEEE Standards Association, "Part 11: Wireless LAN Medium Access Control (MAC) and Physical Layer (PHY) Specifications," IEEE Standard for Information technology—Telecommunications and information exchange between systems, Local and metropolitan area networks—Specific requirements, IEEE Computer Society, IEEE Std 802.11, Mar. 29, 2012, 2793 pages.

* cited by examiner

USER PROFILE PROVISIONING IN WLAN

CROSS REFERENCE TO RELATED APPLICATION

This application is a 35 U.S.C. § 371 national stage application of PCT International Application No. PCT/EP2015/069451, filed on Aug. 25, 2015, the disclosure and content of which is incorporated by reference herein in its entirety.

TECHNICAL FIELD

The invention relates to a method for operating an entity of a WLAN network, to a method for operating an authentication entity configured to authenticate a subscriber of a mobile communication network. Furthermore, the corresponding entity of the WLAN network and the corresponding authentication entity is provided, a system with the entity of the WLAN network and the authentication entity and a computer program, a computer program product and a carrier.

BACKGROUND

Quality-of-Service (QoS) in 3GPP

Many services and subscribers share the same radio and network resources. Real-time services (voice, video etc.) are using the same resources as non-real-time services (Internet browsing, file download etc). One challenge in this area is how to ensure QoS (bit rates, packet delays, packet loss) for Real Time Services. 3GPP EPS (Evolved Packet System) (i.e. both E-UTRAN and EPC (Evolved Packet Core)) provides efficient QoS mechanisms to ensure that the user experience of different services sharing the same resources is acceptable. Examples of such mechanisms provided in 3GPP are:
1. Traffic Separation: Different traffic types receive different treatment (queuing, etc.) in network
2. 3GPP provides for both relative QoS and absolute QoS (using Guaranteed Bit Rates)
3. GBR (Guaranteed Bit Rate) based admission control is used to reserve resources before traffic is admitted into the network or rejected otherwise
4. Policy (PCC, Policy and Charging Control) determines what treatment to apply to the traffic streams 3GPP defines the concept of a PDN; a Packet Data Network. A PDN is in most cases an IP network, e.g. Internet or an operator IMS (IP Multimedia Subsystem) service network. A PDN has one or more names; each name is defined in a string called APN (Access Point Name). The PGW (Packet Gateway) is a gateway towards one or more PDNs. A UE (User Equipment) may have one or more PDN connections. A PDN connection is a logical IP tunnel between UE and PGW, providing the UE access to a PDN. The setup of a PDN connection is initiated from the UE.

Every PDN connection comprises one or more bearers. See 3GPP Technical Specification (TS) 23.401 section 4.7.2 for a description of the bearer concept. A bearer uniquely identifies traffic flows that receive a common QoS treatment between a UE and a PGW (Packet Gateway). Each bearer on a particular access has a unique bearer ID. On the 3GPP access, the bearer is end-to-end between UE and PGW. Every PDN connection has at least one bearer and this bearer is called the default bearer. All additional bearers on the PDN connection are called dedicated bearers.

There are two types of bearers: GBR and non-GBR bearers. Every EPS bearer is associated with the following QoS parameters: QoS Class Identifier (QCI) and Allocation and Retention Priority (ARP). GBR bearers are in addition associated with bit rate parameters for Guaranteed Bit Rate (GBR) and Maximum Bit Rate (MBR). Non-GBR bearers do not have bearer-level bit rate parameters. Instead there is aggregate enforcement of all non-GBR bearers using Aggregate Maximum Bit Rates (AMBR) (APN-AMBR: defined per subscriber and Access Point Name, and UE-AMBR: defined per subscriber).

Quality-of-Service (QoS) in WLAN

Wi-Fi uses carrier-sense, multiple-access with collision avoidance (CSMA/CA). Prior to transmitting a frame, CSMA/CA requires each device to monitor the wireless channel for other Wi-Fi transmissions. If a transmission is in progress, the device sets a back-off timer to a random interval, and tries again when the timer expires. Once the channel is clear, the device waits a short interval—the arbitration inter-frame space—before starting its transmission. Since all devices follow the same set of rules, CSMA/CA ensures "fair" access to the wireless channel for all Wi-Fi devices.

In the past, WLANs were mainly used to transport low-bandwidth, data-application traffic. Currently, with the expansion of WLANs into vertical (such as retail, finance, and education) and enterprise environments, WLANs are used to transport high-bandwidth data applications, in conjunction with time-sensitive multimedia applications. This requirement led to the necessity for wireless QoS. Several vendors have supported proprietary wireless QoS schemes for voice applications. To speed up the rate of QoS adoption and to support multi-vendor time-sensitive applications, a unified approach to wireless QoS is necessary. The IEEE 802.11e working group within the IEEE 802.11 standards committee has completed the standard definition in 2005 and the 802.11e amendment has been incorporated into the IEEE 802.11 standard.

Originally, data frames in 802.11 were sent using the Distributed Coordination Function, DCF (chapter 9.2.2 of 802.11-2012). However, the DCF did not provide sufficient means for enabling QoS differentiation between different types of traffic or between different associated STAs (Stations). The 802.11e amendment, also being part of IEEE 802.11-2012, resolved this by introducing the Enhanced Distributed Channel Access, EDCA, by which a certain set of parameters could be adjusted in such a way so that a certain type of traffic is handled with a different priority than another (in the statistical sense). The set of parameters includes:
  The InterFrame Spacing (IFS)
  The Contention Window size (CWmin and CWmax, respectively the lowest and the highest number for the contention window)
  The Transmission Opportunity, TXOP, maximum allowed size There are currently four different QoS differentiations in the 802.11-2012 standard, and they are referred to as Access Categories (AC):
  AC_VO—Voice
  AC_VI—Video
  AC_BE—Best Effort
  AC_BK—Background For each AC, there is a set of IFS, CW and TXOP limit values and all together, the values for the four access categories are referred to as EDCA (Enhanced Distributed Channel Access) Parameter Set. Currently the WLAN AP (Access Point) advertises the EDCA Parameter Set via the EDCA Parameter Set element, in the Beacon, Probe Response, Association Response or Re-association Response frames. Different QoS UEs (UEs or stations that support the 802.11e mechanisms) that are associated or are in process of associating to an AP will use the EDCA parameters advertised by that AP for the uplink direction. In general the AP might choose to use different EDCA parameters for the downlink direction.

FIG. 1 shows a channel access timing for the different Access Categories also for non-QoS traffic. From a general point of view it can be deduced from FIG. 1 that when the wireless channel is busy and when it is detected that the wireless channel is ready for transmission different IFS values are used for different data transmissions in dependence on the relevance and priority. After waiting a time period corresponding to an InterFrame Spacing which depends on the kind of traffic, a timer is started and a transmitting station/UE waits another time period indicated as back off time which again depends on the traffic type. It can be deduced, inter alia, from FIG. 1 that for a voice transmission the transmission channel is accessed earlier than it is the case for a transmission of data relating to access category background.

3GPP/WLAN Interworking

Most current Wi-Fi/WLAN deployments are totally separate from mobile networks, and can be seen as non-integrated from the terminal perspective. Wi-Fi and WLAN are used interchangeably throughout this document. Most operating systems (OSs) for UEs such as Android™ and ioS®, support a simple Wi-Fi offloading mechanism where a UE immediately switches all its IP traffic to a Wi-Fi network upon a detection of a suitable network with a received signal strength above a certain level. Henceforth, the decision to offload to a Wi-Fi or not is referred to as access selection strategy and the term "Wi-Fi-if-coverage" is used to refer to the aforementioned strategy of selecting Wi-Fi whenever such a network is detected.

There are several drawbacks of the "Wi-Fi-if-coverage" strategy.

Though the user/UE can save previous pass codes for already accessed Wi-Fi Access Points (APs), hotspot login for previously non-accessed APs usually requires user intervention, either by entering the pass code in Wi-Fi Connection Manager (CM) or using a web interface. The connection manager is software on a UE that is in charge of managing the network connections of the terminal, taking into account user preferences, operator preferences, network conditions, etc.

No consideration of expected user experience is made except those considered in the UE implemented proprietary solution, and this can lead to a UE being handed over from a high data rate mobile network connection to a low data rate Wi-Fi connection. Even though the UE's OS or some high level software is smart enough to make the offload decisions only when the signal level on the Wi-Fi is considerably better than the mobile network link, there can still be limitations on the backhaul of the Wi-Fi Access Point (AP) that may end up being the bottleneck.

No consideration of the load conditions in the mobile network and Wi-Fi are made. As such, the UE might still be offloaded to a Wi-Fi AP that is serving several UEs while the mobile network (e.g. LTE) that it was previously connected to is rather unloaded.

Interruptions of on-going services can occur due to the change of IP address when the UE switches to the Wi-Fi network. For example, a user who started a Voice over IP (VoIP) call while connected to a mobile network is likely to experience a call drop when arriving home and the UE switching to the Wi-Fi network automatically. Though some applications are smart enough to handle this and survive the IP address change, the majority of current applications do not. This places a lot of burden on application developers if they have to ensure service continuity.

No consideration of the UE's mobility is made. Due to this, a fast moving UE can end up being offloaded to a Wi-Fi AP for a short duration, just to be handed over back to the mobile network. This is specially a problem in scenarios like cafes with open Wi-Fi, where a user walking by or even driving by the cafe might be affected by this. Such ping pong between the Wi-Fi and mobile network can cause service interruptions as well as generate considerable unnecessary signaling (e.g. towards authentication servers).

Recently, Wi-Fi has been subject to increased interest from cellular network operators, not only as an extension to fixed broadband access. The interest is mainly about using the Wi-Fi technology as an extension, or alternative to cellular radio access network technologies to handle the always increasing wireless bandwidth demands. Cellular operators that are currently serving mobile users with, e.g., any of the 3GPP technologies, LTE, UMTS/WCDMA, or GSM, see Wi-Fi as a wireless technology that can provide good support in their regular cellular networks. The term "operator-controlled Wi-Fi" points to a Wi-Fi deployment that on some level is integrated with a cellular network operators existing network and where the 3GPP radio access networks and the Wi-Fi wireless access may even be connected to the same core network and provide the same services.

When a mobile communications network is integrated with a WLAN network, there is a need to avoid at least some of the above-mentioned drawbacks and to take into account existing information available for a subscriber of a mobile communications network as far as the handling of WLAN network resources is concerned.

SUMMARY

This need is met by the features of the independent claims. Further aspects are described in the dependent claims.

According to a first aspect, a method for operating an entity of a WLAN network is provided, the method comprising the step of receiving an access request from a subscriber of a mobile communications network, wherein the access request is based on a mobile network identity used in the mobile communications network to authenticate the subscriber. Furthermore, the entity receives from an authentication entity configured to authenticate a subscriber in the mobile communications network radio resource information for the subscriber. This radio resource information comprises subscriber-specific information how radio resources of the radio network part of the mobile communications network should be used. The radio resource usage of the subscriber in the WLAN network is then determined taking into account the received radio resource information.

With this method it is possible to differentiate between different subscribers in the WLAN network and to provide different radio resource usage in the WLAN network based on information about the radio network attributes known for that subscriber in the mobile communications network.

Furthermore, the corresponding entity of the WLAN network is provided comprising the interface where the access request and the radio resource information is received, and furthermore comprising a processing unit which determines the radio resource usage taking into account the received radio resource information of mobile communications network.

Furthermore, a method is provided for operating an authentication entity configured to authenticate a subscriber of a mobile communications network. The subscriber requested access to an entity of the WLAN network based on a mobile network identity used in the mobile communications network to authenticate the subscriber. The method comprises the step of receiving network resource information for a subscriber from a subscriber database, wherein the radio resource information comprises subscriber-specific information how radio resources of a radio network part of the mobile communications network should be used. Furthermore, the authentication entity forwards the received radio resource information to the entity of the WLAN network.

The authentication entity provides the information received from a database such as the HLR or HSS concerning radio network preferences of the mobile communications network to the access point or entity of the WLAN network so that the latter can use the information.

According to one aspect, a computer program comprising a program code to be executed by at least one processing unit of an entity of a WLAN network or an authentication entity is provided wherein execution of the program code by the at least one processing unit causes the entity or the authentication entity to perform steps as mentioned above or as mentioned in further detail below. Furthermore, a computer program product comprising the program code is provided and a carrier comprising the computer program.

It is to be understood that the features mentioned above and features yet to be explained below can be used not only in the respective combinations indicated, but also in other combinations or in isolation without departing from the scope of the present invention. Features of the above and below described aspects and embodiments may be combined with other embodiments unless explicitly mentioned otherwise.

BRIEF DESCRIPTION OF THE DRAWINGS

The foregoing additional features and effects of the application will become apparent from the following detailed description when read in conjunction with the accompanying drawings in which like reference numerals refer to like elements.

DETAILED DESCRIPTION

Figure 1:
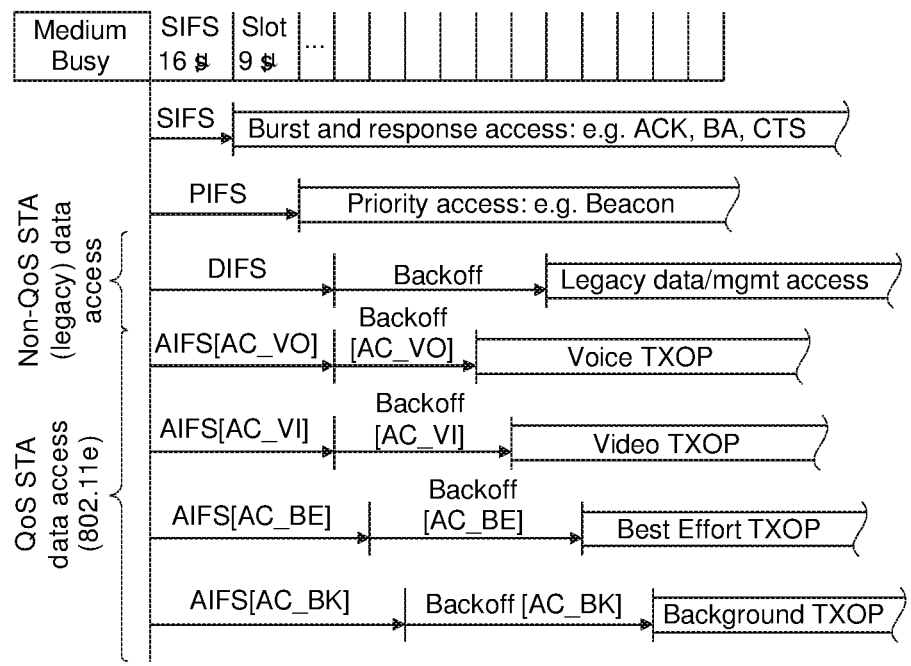
FIG. 1 is a schematic view of a timing of channel access priorities based on different access categories.

In the following embodiments of the invention will be described in detail with reference to the accompanying drawing. It is to be understood that the following description of embodiments is not to be taken in the limiting sense. The scope of the invention is not intended to be limited by the embodiments described hereinafter or by the drawings which are to be taken demonstratively only. The drawings are to be regarded as being schematic representations and elements illustrated in the drawings are necessarily shown to scale. Rather, the various elements are represented such that their function and general purpose becomes apparent for a person skilled in the art. Any connection or coupling between functional blocks, devices, components or other physical or functional units shown in the drawings as described herein may be implemented by an indirect connection or coupling. A coupling between components may be established over a wired or a wireless connection. Functional blocks may be implemented in hardware, firmware, software or combination thereof.

Hereinafter, techniques are described how user profile information relating to subscriber specific preferences of a radio access network can be provided to the WLAN network so that it could generate the appropriate WLAN quality of service provisioning or can take the best radio resource management steps for that particular subscriber. In the following a method is provided of an integrated mobile communication network and a WLAN wireless system by which a user profile, especially radio resource information of the subscriber stored in the HSS or HLR is provided to the WLAN network. The radio resource information may include the SPID (Subscriber Profile Identity) or the RFSP (RAT Frequency Selection Priority) of the subscriber which requests access to the WLAN network. The present invention especially relates to an embodiment where the subscriber accessing the WLAN network uses authentication information of the mobile communication network, e.g. 3GPP network credentials such as SIM credentials stored in the HLR/HSS.

In one embodiment the radio resource information stored in the HSS/HLR is piggybacked on the WLAN access authentication signalling and thereby forwarded from the HSS/HLR to the AAA server (Authentication, Authorization, Accounting) and then further to the WLAN access network. When the UE of the subscriber supports, for example, EAP-SIM/AKA/AKA' authentication, the AAA server retrieves security triplets from the HLR/HSS. EAP stand for Extendible Authentication Protocol and in this embodiment the Subscriber Identity Module (SIM) is used for authentication and EAP-AKA is the Extendible Authentication Protocol with Authentication and Key Agreement (EAP-AKA) in which an EAP mechanism is used for authentication and session key distribution using the UMTS subscriber identity module wherein EAP-AKA' is a variant of EAP-AKA and is used for a non 3GPP access to a 3GPP call network.

Different interfaces are used between AAA server and HLR and AAA server and HSS. In case of AAA server and HLR the interface is called D-interface or Gr-interface and sometimes also named as D' or Gr' interface. The protocol used in these interfaces is called Mobile Application Part (MAP) and is defined in 3GPP TS 29.002. The examples discussed below will be using the HLR as example. However, it should be understood that the same principles would apply to the case of HSS in which case the interface between HSS and AAA server is called SWx interface and defined in 3GPP TS 29.273.

Figure 2:
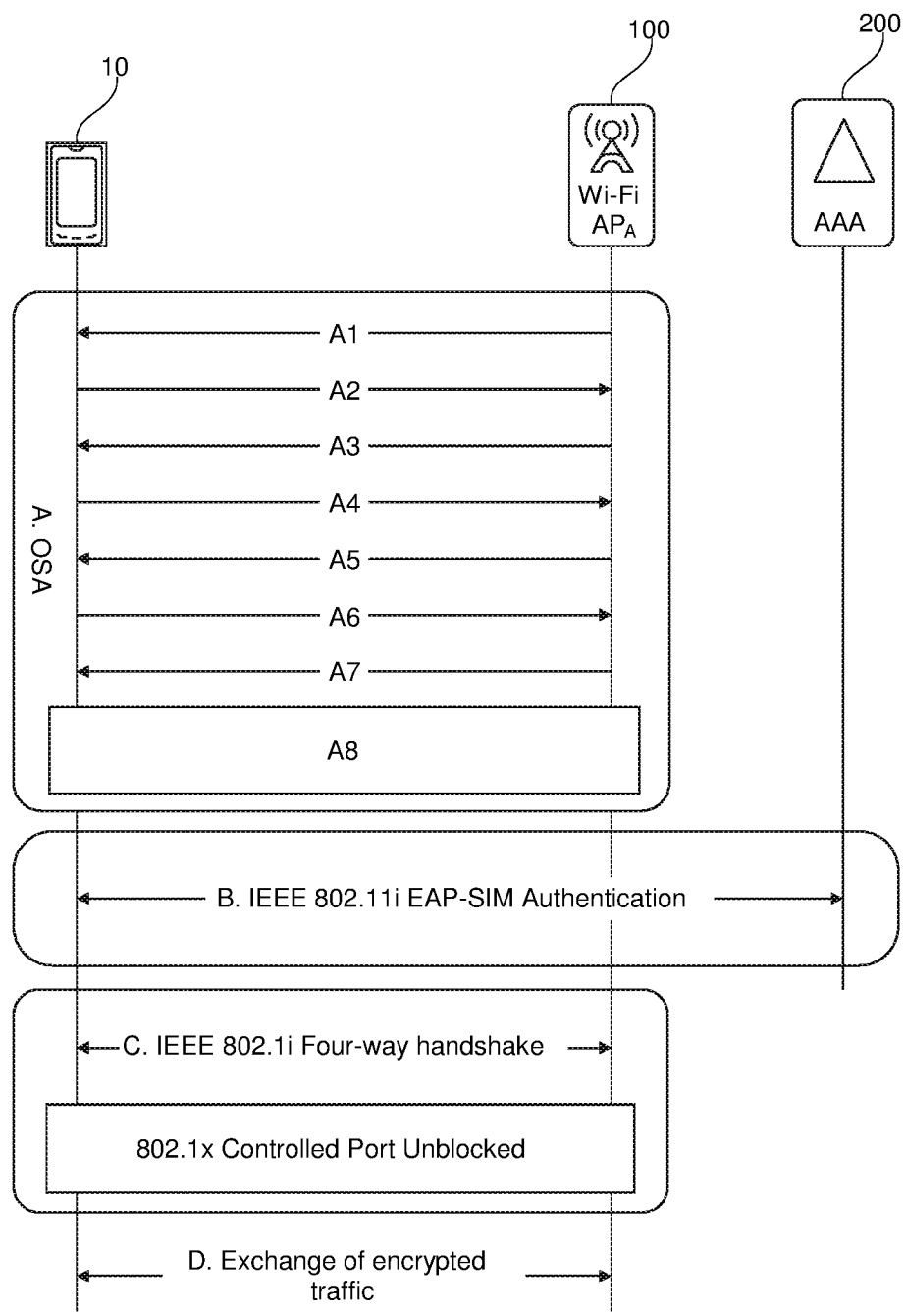
FIG. 2 is an example message flow of how enhanced distributed channel access, EDCA parameters are delivered to a user entity.

FIG. 2 shows a schematic overview of an access procedure of a UE 10 connecting to a Wi-Fi or WLAN access point 100, wherein the AAA server 200 of a mobile communication network is involved as the user of the UE uses a mobile network identity such as SIM authentication for accessing the Wi-Fi access point 100. As can be seen from FIG. 2 the whole procedure comprises four different parts. A first part A mainly relates to the authentication process of the UE, and in a part B the AAA server is involved to authenticate the subscriber. Part C relates to the setup of over-the-air encryption based on keys received in the previous step and part D finally relates to the exchange of encrypted data traffic.

In the following, parts A and B will be discussed in more detail.

First of all, we will discuss in more detail part A as also depicted in FIG. 2.

Part A—Open System Authentication (OSA)

The method comprises inter alia the following steps A1 to A8:

A1 The UE 10 receives a Beacon frame revealing (among other parameters) the security features associated with the ESS (Extended Service Set) the AP 100 belongs to. The format of the beacon frame as well as all the information elements it carries are described in Chapter 8.3.3.2 of IEEE 802.11-2012. The beacon carries the set of EDCA Parameters, which are applicable to all UEs in the BSS (Basic Service Set) (i.e., generic EDCA parameters, not UE specific)

A2 If the UE does not receive a Beacon frame for some reason, it can generate a Probe Request and send it to the AP. This procedure is called active scanning and by performing it, the UE can receive from the AP the same information as it would have from a Beacon message. The Probe Request frame is described in Chapter 8.3.3.9 of IEEE 802.11-2012;

A3 The AP answers with Probe Response—IEEE 802.11-2012, Chapter 8.3.3.10. The Probe Response carries a set of EDCA Parameters, which could be UE-specific.

a. NOTE: The discovery procedure comprises either step A1 or steps A2 and A3 (i.e., receiving a Beacon frame and exchanging probe messages are mutually exclusive);

A4 The UE 10 sends an Open System Authentication Request as defined in Chapter 11.2.3.2 of IEEE 802.11-2012;

A5 The AP 100 responds with an Open System Authentication Response;

A6 The UE 10 then sends an Association Request (or Re-association Request if the UE has been previously associated), indicating the security parameters to be used later.

A7 The AP 100 responds with an Association Response. The Re(association) Response carries a set of EDCA Parameters, which could be UE-specific.

A8 At this point the Open System Authentication is completed and the STA can communicate only with the AP—the rest of the traffic is blocked by the port-based network control (PBNC) enforcer, as defined in IEEE 802.1X. Some of the traffic towards external hosts, however, can be forwarded by the AP, as in the case of the communication with the RADIUS server;

In the following, part B of FIG. 2 will be described in more detail with reference to FIG. 4. In this part B the UE authenticates to the back-end authentication server 200 using 802.11i mechanism; 802.11i is consolidated in 802.11-2007 which is the basis for 802.11-2012. Master keys are sent to the access point 100 and generated in the UE 10 and the following steps B1 to B19 are carried out.

Part B—802.11i Authentication (EAP-SIM/AKA/AKA'/TLS/Etc.)

B1 This step is the first step of the EAP-SIM authentication RFC 4186. The AP 100 encapsulates an EAP-Request of Type 18 (SIM) inside an EAPOL frame, asking the UE to report its identity. In the case where that the UE 10 is equipped with a SIM, the identity is the IMSI (International Mobile Subscriber Identity), followed by the "@" sign and the home realm. It is also possible for the UE 10 to include an additional "1" in front of the IMSI in order to indicate preference for the exclusive use of EAP-SIM if other EAP methods are available (e.g., EAP-AKA);

B2 The UE 10 responds with its identity. An example of such is: "1234580123000100@wlan.mnc048.mcc264.3gppnetwork.org";

B3 The AP 100 extracts the EAP-Request message, encapsulates it in a RADIUS frame and forwards it to the backend AAA server 200. The handling of EAP frames over RADIUS is described by the IETF in RFC 3579;

B4 The AAA server 200 recognizes the EAP method and sends an EAP-Request/SIM/Start, indicating that an EAP-SIM procedure has been initiated for that Supplicant. It also includes the list of supported SIM versions in the message as described in Chapter 10.2 of RFC 4186;

B5 The AP 100 relays the EAP-Request/SIM/Start message to the UE 10;

B6 The STA responds with EAP-Response/SIM/Start message, which carries information about the supplicant's ANonce (a randomly selected number), as well as the selected SIM version (AT_SELECTED_VERSION);

B7 The AP 100 forwards the EAP-Response/SIM/Start to the AAA server 200;

B8 The AAA server 200 sends a SendAuthInfo request message to the HLR 16 comprising a request for authentication information. The authentication information may for example be 1 or more authentication vectors. The SendAuthInfo request message may for example be a MAP_SEND_AUTHENTICATION_INFO message/primitive as defined in 3GPP TS 29.002 V12.3.0 section 8.5.2. The request message comprise information identifying the UE, such as the IMSI of the UE.

B9 The HLR 16 sends a response message back to the AAA server 200, i.e. a response to the SendAuthInfo request message in step 8. The response message contains the requested number of authentication vectors, for example up to 5 GSM triplets (see step B12 below for detailed description).

In this message B9 radio resource information of the subscriber/UE 10 is included. The radio resource information can include the SPID and/or RFSP information.

B10 The AAA server 200 may optionally send an additional request message to the HLR requesting subscription information for the UE by updating the GPRS location for the UE. The request may be an UpdateGPRSLocation message (for example as defined in 3GPP TS 29.002 V12.3.0 in section 8.1.7 as MAP_UPDATE_GPRS_LOCATION message/primitive). The message contains at least information identifying the UE 10, e.g. IMSI, and information identifying a new SGSN (Server GRRS Support Node) (as in this case the AAA server acts as a SGSN towards the HLR).

B11 The HLR 16 sends a message comprising subscription information associated with the UE 10 to the AAA server 200 indicated in the UpdateGPRSLocation message. Such message may be e.g. an InsertSubscriberData message (for example as defined in 3GPP TS 29.002 V12.3.0 in section 8.8.1 as MAP_INSERT_SUBSCRIBER_DATA). The message may comprise at least one of a MSISDN, Operator Determined Barring (ODB) and GprsProfile.

Figure 4:
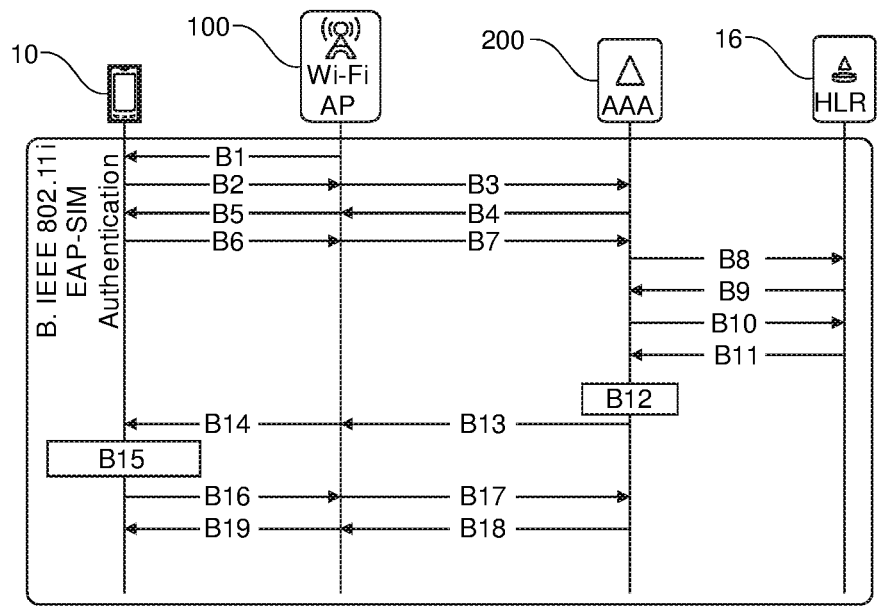
FIG. 4 shows an example of a message exchange between the involved entities of how radio resource information is transmitted to an authentication entity of the mobile network.

B12 The AAA server obtained the GSM triplet (RAND, SRES and Kc) in step 9 and derives the keying material as specified in Chapter 7 of RFC 4186. The GSM triplet comprises:

a. RAND—a 128-bit random number, generated by the Authentication Center (an entity within the GSM core network, used to authenticate subscribers at the point of initial attach) when a subscriber authentication is requested. Its main use is for the derivation of the Signed Response (SRES) and the Kc;

b. SRES—a 32-bit variable, used to challenge the UE 10;

c. Kc—a 64-bit ciphering key, used to encipher and decipher data transmitted between the UE 10 and the AP 100;

B13 The AAA 200 generates an EAP-Request/SIM/Challenge message, including RAND challenges and message authentication code attribute (AT_MAC). The AT_MAC derivation is based on the RAND and Kc values;

B14 The AP 100 forwards the EAP-Request/SIM/Challenge message to the UE 10;

B15 The UE 10 feeds the received RAND into the GSM algorithms running on the SIM and the output is a copy of the AT_MAC and a SRES value. The first thing is to check whether the AT_MAC value received by the AAA and the one generated by the SIM match. If so the STA continues with the authentication, otherwise it responds with an EAP-Response/SIM/Client-Error message. The second thing is to derive a new AT_MAC, based on the previously generated SRES;

B16 The new AT_MAC is sent to the AAA server 200 in an EAP-Response/SIM/Challenge message;

B17 The AP 100 forwards the EAP-Response/SIM/Challenge to the AAA server 200;

B18 The AAA server 200 verifies the new AT_MAC value that the UE 10 has just sent. If the verification is successful, it sends an EAP-Success message, which also carries keying material—Pairwise Master Key (PMK). The PMK is intended for the AP 100 only and it is not forwarded to the UE 10 (the UE can derive the same key autonomously);

In the embodiment of FIG. 4 the radio resource information is transmitted to the AAA server from the HLR as an extension of the existing response message (step B9) in response to the request message in which the AAA server requested the authentication information of the UE.

Figure 3:
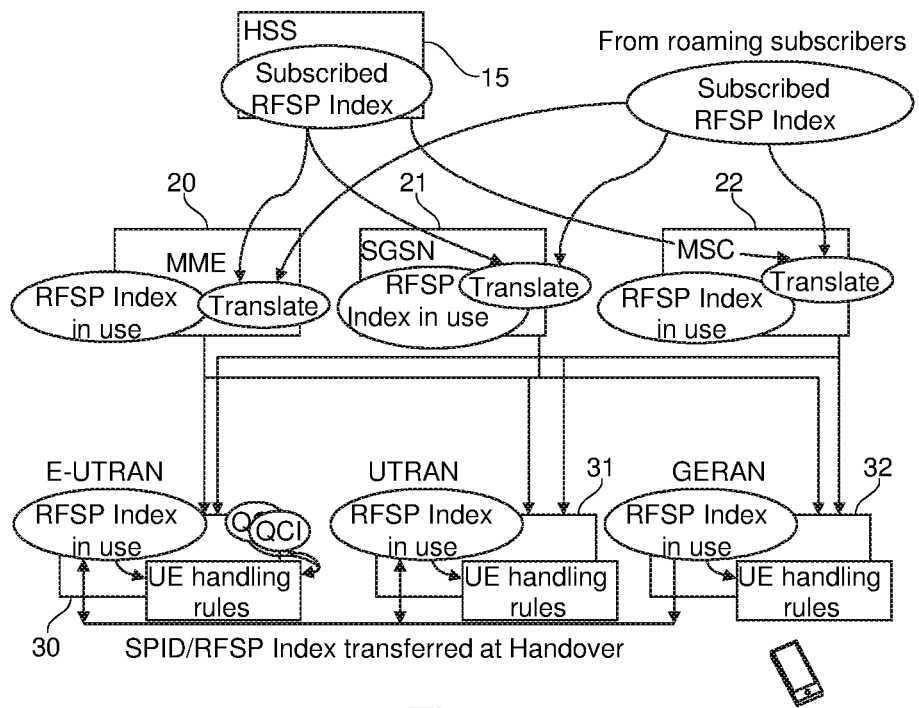
FIG. 3 shows an example flow how radio resource information of a subscriber is distributed to different nodes of a mobile communications network.

The subscriber profile identity (SPID) is one mechanism of the core network of the mobile communication network to indicate UE specific preferences to the radio network of the mobile communications network. It can be used e.g. for both active and idle mode mobility control of the UE 10. SPID is assigned to specific subscriptions and stored in the HSS as shown in FIG. 3. The SPID is also known as RFSP. Therefore, the SPID as stored in HSS 15 is called Subscribed RFSP Index. From the HSS 15 the Subscribed RFSP Index is distributed to the different network components such as MME 20, SGSN 21 or MSC 22 from where it is further distributed to the different radio access network elements such as E-UTRAN 30, UTRAN 31 and GERAN 32. The Subscribed RFSP Index can also be a default value. The MME 20 receives the PID from the HSS 15 during the UE attached procedure and the SPID is also stored in MME. At UE context setup the MME forward the SPID to the eNB and the eNB prioritizes the RATs and carriers for both active and idle mode mobility based on SPID. For roaming subscribers the MME may remove, modify or add SPID based on IMSI analysis.

The SPID value mapping in the eNB to a specific set of RAT or carrier, i.e. to be used as Dedicated Priority information towards the UE 10 are configurable as it may be operator strategy dependent. The following table serves as an example for SPID information.

| SPID | LTE C1 | LTE C2 | WCDMA | GSM | Subscription |
|---|---|---|---|---|---|
| Default | 7 | 6 | 5 | 4 | Normal |
| 1 | No | No | 6 | 7 | Telephony only |
| 2 | No | No | 7 | 6 | No LTE |

In the table above, number 7 indicates the highest priority and "No" stands for a forbidden technology or carrier. For example, an SPID value of 2 would indicate that the UE is not allowed to access LTE and that WCDMA has a higher priority than GSM. There are different ways on how the SPID can be sent from the core network to the radio access network RAN.

Currently, in a wireless system where the 3GPP network is integrated with a WLAN, there is a mechanism to deliver user profile related information (e.g., the Subscriber Profile Identifier, SPID or RFSP, RAT/Frequency Selection Priority index) to the 3GPP RAN, but, without the invention, not to the WLAN. The term "integrated with" between 3GPP network and WLAN means that at least the WLAN access authentication is based on 3GPP network credentials, i.e. SIM credentials stored in the HLR/HSS of the 3GPP network.

Figure 5:
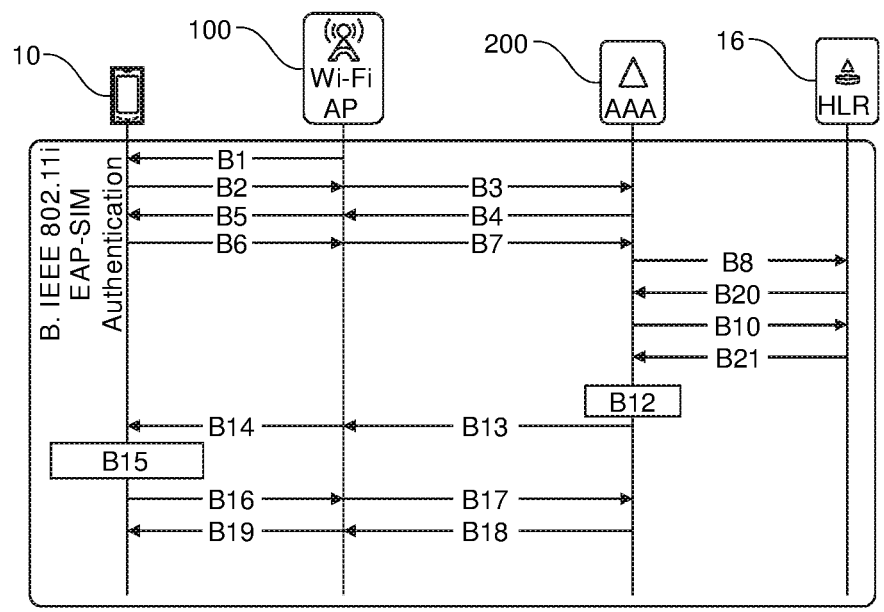
FIG. 5 shows an example message flow as shown in FIG. 4 wherein the radio resource information is transmitted to the authentication entity according to another embodiment.

FIG. 5 shows a further embodiment of a message exchange between the entities shown in FIG. 4 and how the radio resource information is transmitted from the HLR 16 to the AAA server 200. In the embodiment of FIG. 5 the messages which correspond to the embodiment of FIG. 4 have the same reference numerals. Thus, steps B1 to B8 correspond to steps B1 to B8 of FIG. 4. Step B20 corresponds to the step B9 of FIG. 4 with the exception that the radio resource information such as SPID/RFSP is not included into this message. Instead, the radio resource information is included into step B11 of FIG. 4, thus into new step B21 where the radio resource information is sent as an extension of the message in which the HLR sends the subscriber information to the AAA server 200. The other steps B13 to B19 are unamended compared to FIG. 4.

Figure 6:
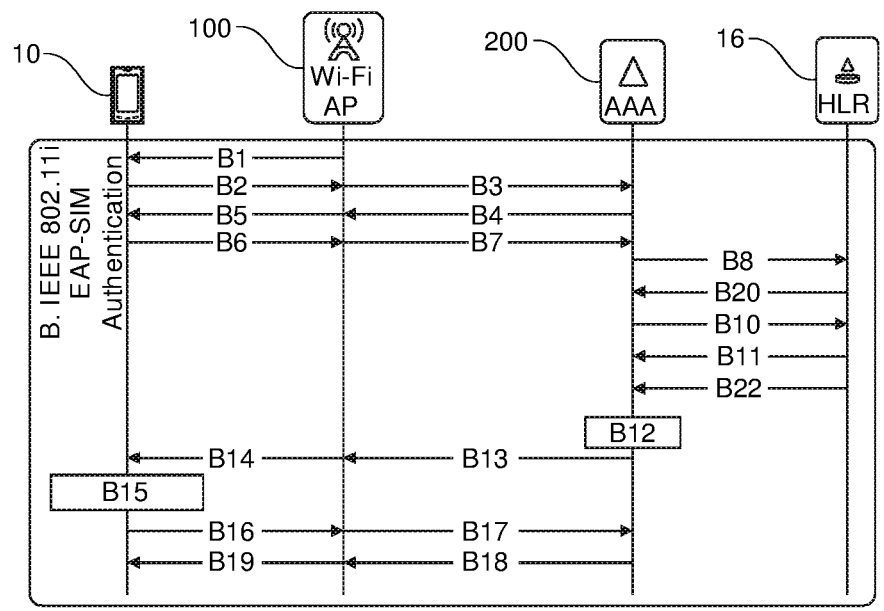
FIG. 6 shows an example of a message flow of the system of FIG. 4 in which radio resource information is transmitted to the authentication entity in still another embodiment.

FIG. 6 shows a further embodiment in which the radio resource information is sent in a separate message. In FIG. 6 step B20 corresponds to step B20 of FIG. 5 and step B11 corresponds to step B11 of FIG. 4. Steps B1 to B8, B10, B11, and B14 to B19 are the same as in FIG. 4. However, the HLR uses a new MAP message, in step B22 to transmit SPID/RFSP information to the AAA server 200.

In a further embodiment, the AAA server 200 may request the SPID/RFSP from the HLR with a new MAP message (not shown in FIG. 6) in which the requesting UE/subscriber is identified e.g. with the IMSI; this new MAP message could be sent prior to B22. The response message could be the message B22 shown in FIG. 6. In FIGS. 4 to 6 the radio resource information is pushed to the AAA 200, so that no request from the AAA 200 is needed. In another embodiment, AAA 200 requests the transmission of the radio resource information, e.g. in steps B8 or B10.

Figure 7:
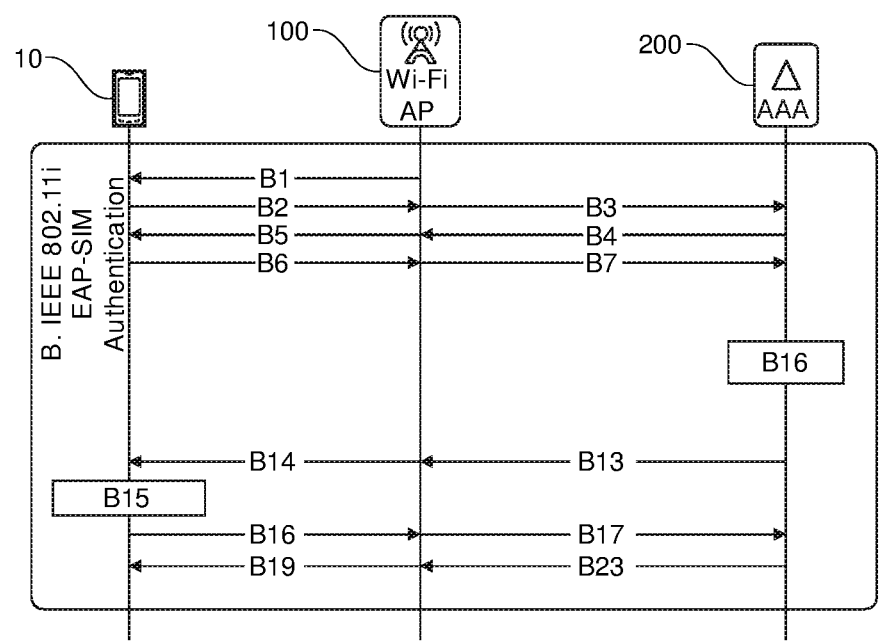
FIG. 7 shows an example of a message flow of how radio resource information is transmitted from the authentication entity of the mobile communications network to an access point of the WLAN network.

FIG. 7 now specifies how the radio resource information received at the AAA server 200 is transmitted to the access point 100. In FIG. 7 the steps carrying the same reference numerals as in FIG. 4 correspond to the steps explained in connection with FIG. 4. However, new step B23 was amended compared to step B18 of FIG. 4, in such a way that this message informing the access point 100 about the successful verification now includes the radio resource information.

By way of example, the radio resource information can be included as a new radius attribute wherein this new radius attribute could be carried as part of existing radius procedures and may be included in the radius access challenge message, the access accept message as shown in FIG. 7 or in a change of authorization message.

It should be understood that as in FIG. 6 the radio resource information could also be transmitted to the access point 100 in a separate message.

One format of an radio attribute message is shown below.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type    (26)      |    Length     |         Vendor-Id
+-+-+-+-+-+-+-+-+-+-+-+-+-+-+-+-+-+-+-+-+-+-+-+-+-+-+-+-+-+-+-+-+
       Vendor-Id (cont.)                |     String ...
+-+-+-+-+-+-+-+-+-+-+-+-+-+-+-+-+-+-+-+-+-+-+-+-+-+-+-+-+-+-+-+-+
```

In the embodiment shown above, the string part of the RADIUS attribute could include the radio resource information.

In another embodiment the vendor-specific RADIUS attribute for carrying the user profile/radio resource information is formatted as a Wi-Fi Alliance vendor-specific RADIUS attribute as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type    (26)      |    Length     |         Vendor-Id
+-+-+-+-+-+-+-+-+-+-+-+-+-+-+-+-+-+-+-+-+-+-+-+-+-+-+-+-+-+-+-+-+
       Vendor-Id (cont.)                |    Sub-type   |   Sub-length  |
+-+-+-+-+-+-+-+-+-+-+-+-+-+-+-+-+-+-+-+-+-+-+-+-+-+-+-+-+-+-+-+-+
|    Value ...
+-+-+-+-+-+-+-+-+-+-+-+-+-+-+-+-+-+-+-+-+-+-+-+-+-+-+-+-+-+-+-+-+
```

In the further example above, the value field could include the value resource information of the subscriber such as the SPID or RFSP.

When the access point finally receives the radio resource information, it can use this information when determining a radio resource management, RRM, strategy for the particular subscriber. The access point may react in such a way that some features of the radio access network of the WLAN may only be available for certain subscribers or subscriber types. By way of example, the availability of certain frequency bands could depend on the received radio resource information. By way of example, important subscribers are allowed to use all available bands, while less important subscribers are only allowed to use the 2.4 GHz band.

Furthermore, it is possible that the EDCA Parameters may depend on the received radio resource information. By way of example, a first access category may be available for a first set of subscribers whereas other subscribers may be allowed to use all different access categories.

Furthermore, the beamforming capabilities of the WLAN network may depend on the received radio resource information. Additionally, the use of MIMO (Multiple Input Multiple Output) techniques may depend on the received radio resource information.

It is furthermore possible that the received radio resource information such as SPID/RFSP is used by the WLAN network/access point 100 to determine whether the UE 10 should be steered to the mobile communication network and to which RAT/carrier on the mobile communication network.

Furthermore, it is possible that the WLAN can support multiple mobile communication networks and each of the mobile communication networks transmit their radio resource information so that the access point can use the resource information from each and every network. Different subscribers from different networks could be controlled in dependence on the corresponding radio resource information received from the network to which the subscriber belongs. Another alternative is for the access point of WLAN network to maintain PLMN (Public Land Mobile Network) specific SPID tables with different tables for each PLMN. Furthermore, access point may maintain an SPID filtering function which is capable of taking the received SPID and to modify it based on the SPID and the PLMN it was received from.

Figure 8:
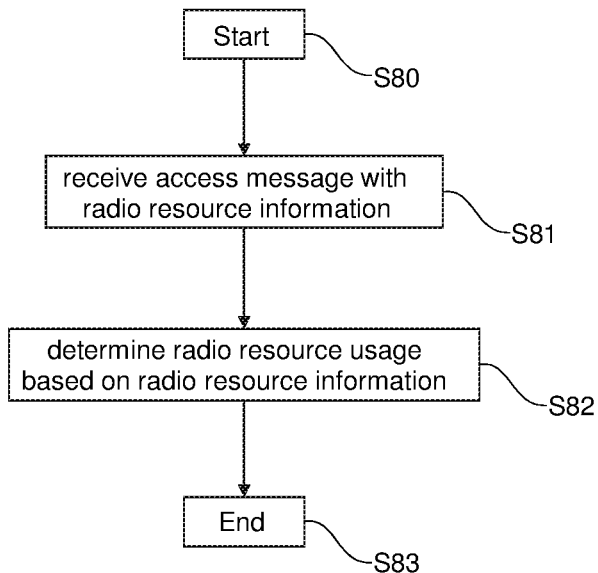
FIG. 8 shows an example flowchart comprising the steps carried out at an authentication entity of the mobile communication network to deliver radio resource information of a subscriber to an access point.

FIG. 8 summarizes the steps carried out at an entity of the WLAN network such as the access point in the above described procedures. The method starts in step S80. In step S81 an access message is received such as the message received in steps B13, B18 or B23. The access point 100 may have transmitted a request to AAA 200 requesting the transmission of radio resource information which is then forwarded by the AAA 200 to the HLR 16. However, the HLR may also without receiving a request push the radio resource information via AAA 200 to the access point 100. In step S82, the access point or any other entity of the WLAN network receiving the message in step S81 can then determine the radio resource usage for the requesting subscriber of the mobile communications system taking into account the radio resource information received with the access message. As mentioned above, the availability of frequency bands in the WLAN network may depend on the received radio resource information, the EDCA parameters, the beamforming capabilities and so on. The method ends in step S83.

Figure 9:
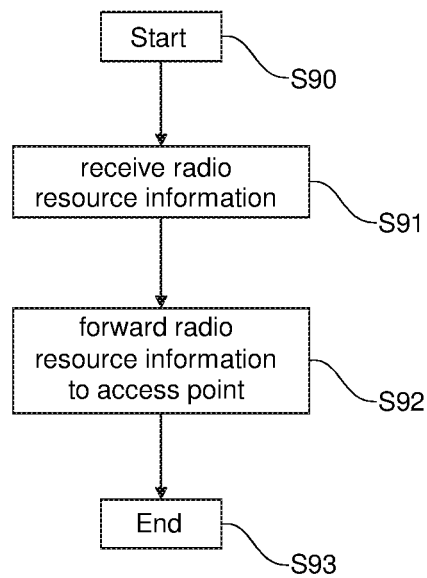
FIG. 9 shows an example flowchart comprising the steps carried out at an access point receiving radio resource information from a subscriber.

FIG. 9 summarizes the steps carried out at an AAA server 200. The method starts in S90. In step S91, the radio resource information is received from the HLR 16. The radio resource information may be piggybacked onto another message as shown in FIGS. 4 and 5 or may be sent as a separate message as shown in FIG. 6. The AAA server 200 then forwards the received radio resource information to an entity of the WLAN network, e.g. the access node 100 in step S92. The method ends in step S93.

Figure 10:
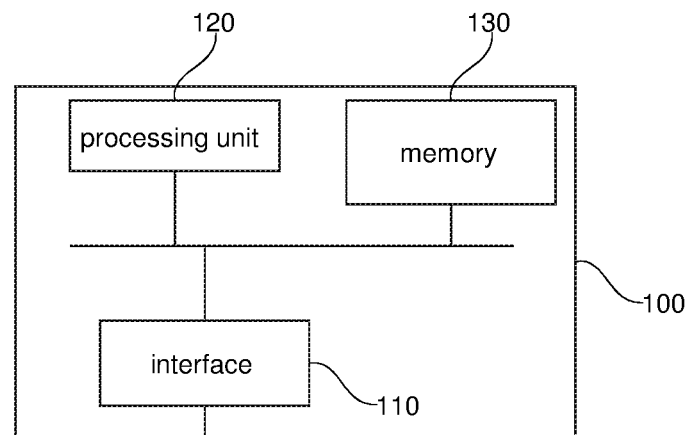
FIG. 10 is a schematic representation of an access point present in the above-mentioned message flows of FIGS. 4 to 7.

FIG. 10 shows a schematic view of the WLAN entity which controls the usage of the radio resource within the WLAN network based on the received radio resource information of the mobile communications network. The entity 100, e.g. the access point, comprises an interface 110 which is used to transmit user data or control messages to other entities such as the other entities shown in FIGS. 4 to 7, e.g. nodes of the WLAN network or of the mobile communications network. The interface is furthermore configured to receive control messages or user data from any other node of the WLAN network or of the communications network and is furthermore configured to transmit inter alia the received data to a wide area network such as the Internet. The interface 110 is configured to operate in accordance with different interface protocols, e.g. it may operate as a D-interface or Gr-interface. The access node 100 further comprises a processing entity 120 which is responsible for the operation of the access node as discussed above. The processing unit 120 can comprise a plurality of processors. The processing unit 120 may use suitable program codes stored in memory 130 to carry out the steps in which the access point is involved as discussed above.

The memory 130 can be built as a random access memory, a read-only memory, a hard disk or the like.

Figure 11:
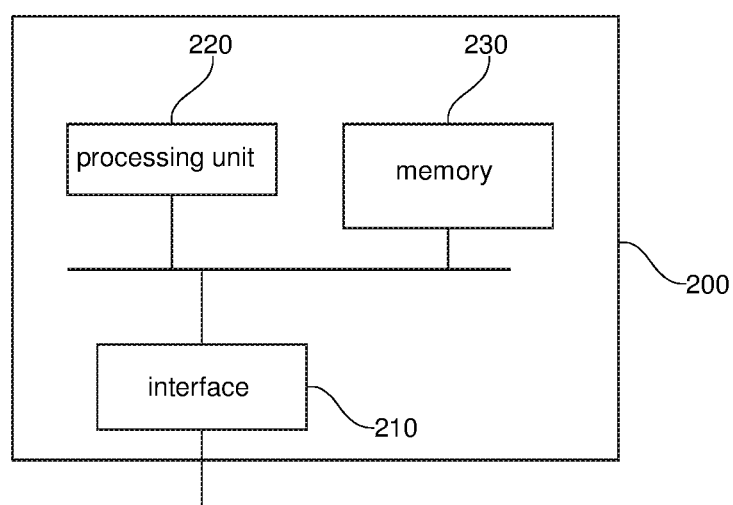
FIG. 11 is a schematic representation of an authentication entity present in the message flow shown in FIGS. 4 to 7.

FIG. 11 shows a schematic structure of the AAA unit 200. The AAA unit 200 comprises an interface 210 which is configured to transmit and receive user data or control messages to other entities or from other entities. Inter alia, interface 210 is configured to transmit the messages to interface 110 of the access node and to transmit the access information. A processing unit 220 is responsible for the operation of the AAA server as discussed above. The processing unit 220 may use suitable program codes stored in memory 230 in order to carry out the steps in which the authentication entity 200 is involved in the above described method steps. Memory 230 may furthermore comprise program codes needed to carry out authentication procedures, authorization procedures or accounting procedures as known from an AAA server of a mobile communications network.

It should be understood that the access point 100 of FIG. 10 and the authentication entity 200 of FIG. 11 could comprise a plurality of further functional modules which are not shown for the sake of clarity. By way of example, the access point 100 may comprise antenna modules used for the wireless reception and transmission of data to UE 10 or from UE 10.

As described above, the invention provides an apparatus, such as the authentication entity or the entity of the WLAN such as the access node, wherein each of these entities comprise a processing unit and a memory, said memory containing instructions executable by the processing unit, wherein the apparatus is operative to carry out the different steps mentioned above in which the AAA 200 or the access point 100 is involved. Furthermore, an apparatus is provided comprising means adapted to carry out the above mentioned steps, wherein the access point comprises means adapted to carry out the steps of FIG. 8, wherein the AAA 200 comprises means adapted to carry out the steps shown in FIG. 9.

From the above discussion, some general conclusions can be drawn.

As far as the access point or entity of the WLAN network is concerned, the access point 100 determines the radio resource usage of the WLAN network taking into account the received radio resource information of the subscriber in the mobile communications network.

This can include the step of determining which frequency bands of the WLAN network the subscriber is allowed to use based on the received radio resource information.

It may furthermore comprise the step of determining a condition under which a data connection of the subscriber is steered from the WLAN network to the mobile communications network based on the received radio resource information.

Furthermore, it could include the step of determining EDCA parameters based on the received radio resource information or the step of determining whether multipath propagation using multiple transmit antennas and multiple receive antennas are used for the subscriber taking into account the received radio resource information.

Different pieces of radio resource information may be received from different mobile communications networks so that a first subscriber from a first mobile communications network is controlled, as far as the radio resource usage is concerned using the corresponding radio resource information from one mobile network, whereas another subscriber is controlled using the radio resource information from the corresponding other mobile communications network, to which the subscriber belongs.

The radio resource information can comprise the SPID or RFSP of the subscriber.

As far as the authentication entity is concerned, the radio resource information may be received from the subscriber database piggybacked on a message transmitted by the subscriber database and received by the authentication entity. By way of example, the radio resource information may be received together with a response message which is received from the subscriber database as a response to a request message sent by the authentication entity to the subscriber database requesting the authentication of the subscriber who requested access to the access point or entity of the WLAN network based on the mobile network identity.

Furthermore, the radio resource information may be received together with a message received from the subscriber database including subscription information. According to another option, it may be received as part of an accept message transmitted to the access point in which the access point is informed about an accepted access of the subscriber to the WLAN network. In another embodiment, the radio resource information is transmitted in a separate message and not piggybacked to another message, so that the main content of this separate message is the radio resource information.

Furthermore, the radio resource information may be forwarded to the access point or entity of the WLAN network as an attribute of a message generated according to a radius protocol.

Summarizing, the above disclosure enables the WLAN network to obtain more information on the user profile and to use this information when deciding a radio resource management strategy. The WLAN network can increase the degree of differentiation between different users or user groups.

The invention claimed is:

1. A method for operating an entity of a WLAN network, comprising:
   receiving an access request from a subscriber of a mobile communications network, wherein the access request is based on a mobile network identity used in the mobile communications network to authenticate the subscriber,
   receiving, from an authentication entity configured to authenticate a subscriber in the mobile communications network, mobility control information for the subscriber which comprises subscriber specific information how radio resources of a radio network part of the mobile communications network should be used,
   determining a radio resource usage of the subscriber in the WLAN network taking into account the received mobility control information,
      wherein determining the radio resource usage comprises determining a condition under which a data connection of the subscriber is steered from the WLAN network to the mobile communications network based on the received mobility control information, and
      wherein the mobility control information is received for a first subscriber from a first mobile communications network and for a second subscriber from a second mobile communications network, wherein the radio resource usage of the two subscribers in the WLAN network is determined taking into account the mobility control information from the corresponding mobile communications network.

2. The method according to claim 1, wherein determining the radio resource usage comprises determining which frequency bands of the WLAN network the subscriber is allowed to use based on the received mobility control information.

3. The method according to claim 1, wherein determining the radio resource usage comprises determining Enhanced Distributed Channel Access, EDCA, parameters based on the received mobility control information.

4. The method according to claim 1, wherein determining the radio resource usage comprises determining whether multipath propagation using multiple transmit antennas and multiple receive antennas is used for the subscriber based on the received mobility control information.

5. The method according to claim 1, wherein mobility control information comprises at least one of a Subscriber Profile Identity, SPID, and a RAT Frequency Selection Priority, RFSP, of the subscriber.

6. An entity of a WLAN network comprising:
   an interface configured to receive an access request from a subscriber of a mobile communications network, wherein the access request is based on a mobile network identity used in the mobile communications network to authenticate the subscriber, wherein the interface is further configured to receive, from an authentication entity configured to authenticate a subscriber in the mobile communications network, mobility control information for the subscriber which comprises subscriber specific information how radio resources of a radio network part of the mobile communications network should be used,
   a processing unit configured to determine a radio resource usage of the subscriber in the WLAN network taking into account the received mobility control information,
      wherein the processing unit is configured to determine a condition under which a data connection of the subscriber is handed over to the mobile communications network based on the received mobility control information, and
      wherein the interface is configured to receive the subscriber specific access information from at least two different mobile communications networks, wherein the processing unit is configured to determine the radio access strategy in the WLAN network taking into account the mobility control information from the at least two different mobile communications networks.

7. The entity according to claim 6, wherein the processing unit is configured to determine which frequency bands of the WLAN network the subscriber is allowed to use based on the received mobility control information.

8. The entity according to claim 6, wherein the processing unit is configured to determine Enhanced Distributed Channel Access, EDCA, parameters based on the received mobility control information.

9. The entity according to claim 6, wherein the processing unit is configured to determine whether multipath propagation using multiple transmit antennas and multiple receive antennas is used based on the received mobility control information.

10. The entity according to claim 6, wherein the entity is an access point of the WLAN network.

11. A computer program product comprising a non-transitory medium storing program code to be executed by at least one processor of an entity of a WLAN network, wherein the program code when executed causes the entity of the WLAN network to:
   receive an access request from a subscriber of a mobile communications network, wherein the access request is based on a mobile network identity used in the mobile communications network to authenticate the subscriber;
   receive, from an authentication entity configured to authenticate a subscriber in the mobile communications network, mobility control information for the subscriber which comprises subscriber specific information how radio resources of a radio network part of the mobile communications network should be used; and
   determine a radio resource usage of the subscriber in the WLAN network taking into account the received mobility control information, wherein determining the radio resource usage comprises determining a condition under which a data connection of the subscriber is steered from the WLAN network to the mobile communications network based on the received mobility control information, and
wherein the program code when executed causes the entity of the WLAN network to receive the subscriber specific access information from at least two different mobile communications networks, and determine the radio access strategy in the WLAN network taking into account the mobility control information from the at least two different mobile communications networks.

12. The computer program product according to claim 11, wherein the program code when executed causes the entity of the WLAN network to determine which frequency bands of the WLAN network the subscriber is allowed to use based on the received mobility control information.

13. The computer program product according to claim 11, wherein the program code when executed causes the entity of the WLAN network to determine Enhanced Distributed Channel Access, EDCA, parameters based on the received mobility control information.

14. The computer program product according to claim 11, wherein the program code when executed causes the entity of the WLAN network to determine whether multipath propagation using multiple transmit antennas and multiple receive antennas is used based on the received mobility control information.

\* \* \* \* \*